United States Patent
Ang

(10) Patent No.: US 8,897,942 B2
(45) Date of Patent: Nov. 25, 2014

(54) CONTROL DEVICE FOR HYBRID VEHICLE, AND HYBRID VEHICLE EQUIPPED WITH CONTROL DEVICE

(75) Inventor: Wanleng Ang, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 137 days.

(21) Appl. No.: 13/810,952

(22) PCT Filed: Jul. 19, 2011

(86) PCT No.: PCT/IB2011/001672
§ 371 (c)(1),
(2), (4) Date: Jan. 18, 2013

(87) PCT Pub. No.: WO2012/010950
PCT Pub. Date: Jan. 26, 2012

(65) Prior Publication Data
US 2013/0124028 A1    May 16, 2013

(30) Foreign Application Priority Data
Jul. 21, 2010 (JP) .................. 2010-163795

(51) Int. Cl.
*B60W 20/00* (2006.01)
*B60W 10/08* (2006.01)
*B60W 10/26* (2006.01)
*B60W 10/06* (2006.01)
*B60L 11/18* (2006.01)
*B60W 50/00* (2006.01)
*H02J 7/00* (2006.01)

(52) U.S. Cl.
CPC ......... *B60W 20/20* (2013.01); *B60W 2550/143* (2013.01); *B60W 10/08* (2013.01); *B60L 11/1851* (2013.01); *B60W 2600/00* (2013.01); *Y02T 10/54* (2013.01); *B60W 20/104* (2013.01); *Y02T 10/7011* (2013.01); *B60W 10/06* (2013.01); *Y02T 10/705* (2013.01); *B60W 2710/244* (2013.01); *B60W 50/0097* (2013.01); *H02J 7/0072* (2013.01); *Y02T 10/7005* (2013.01); *B60W 2550/402* (2013.01); *Y10S 903/93* (2013.01); *Y02T 10/6291* (2013.01); *B60W 10/26* (2013.01); *B60W 20/00* (2013.01); *Y02T 10/84* (2013.01)
USPC .............. 701/22; 180/65.245; 180/65.265; 180/65.29; 903/930

(58) Field of Classification Search
USPC ........................................... 701/22
See application file for complete search history.

(56) References Cited

U.S. PATENT DOCUMENTS

| 6,314,347 | B1 | 11/2001 | Kuroda et al. | |
| 7,954,579 | B2* | 6/2011 | Rodriguez et al. | 180/65.265 |
| 2005/0052080 | A1* | 3/2005 | Maslov et al. | 307/10.1 |
| 2009/0198396 | A1* | 8/2009 | Rodriguez et al. | 701/22 |
| 2009/0206660 | A1* | 8/2009 | Makita et al. | 307/9.1 |

FOREIGN PATENT DOCUMENTS

| EP | 2 141 043 A1 | 1/2010 |
| JP | 2005-180255 A | 7/2005 |
| JP | 2008-087719 A | 4/2008 |

* cited by examiner

Primary Examiner — Mary Cheung
Assistant Examiner — Michael Berns
(74) Attorney, Agent, or Firm — Sughrue Mion, PLLC

(57) ABSTRACT

A hybrid vehicle (100) includes a voltage step-up device (17). The voltage step-up device (17) is provided between driving devices (18, 20) and an electrical storage device (16), and steps up input voltages of the driving devices (18, 20) to a voltage of the electrical storage device (16) or above. An HV-ECU (36) determines whether it is possible to reduce a $CO_2$ emissions for a predetermined travel route by increasing the voltage of the electrical storage device (16). Then, when it is determined that it is possible to reduce the $CO_2$ emissions, the HV-ECU (36) controls an SOC of the electrical storage device (16) so as to increase the SOC at a start of the travel route.

14 Claims, 13 Drawing Sheets

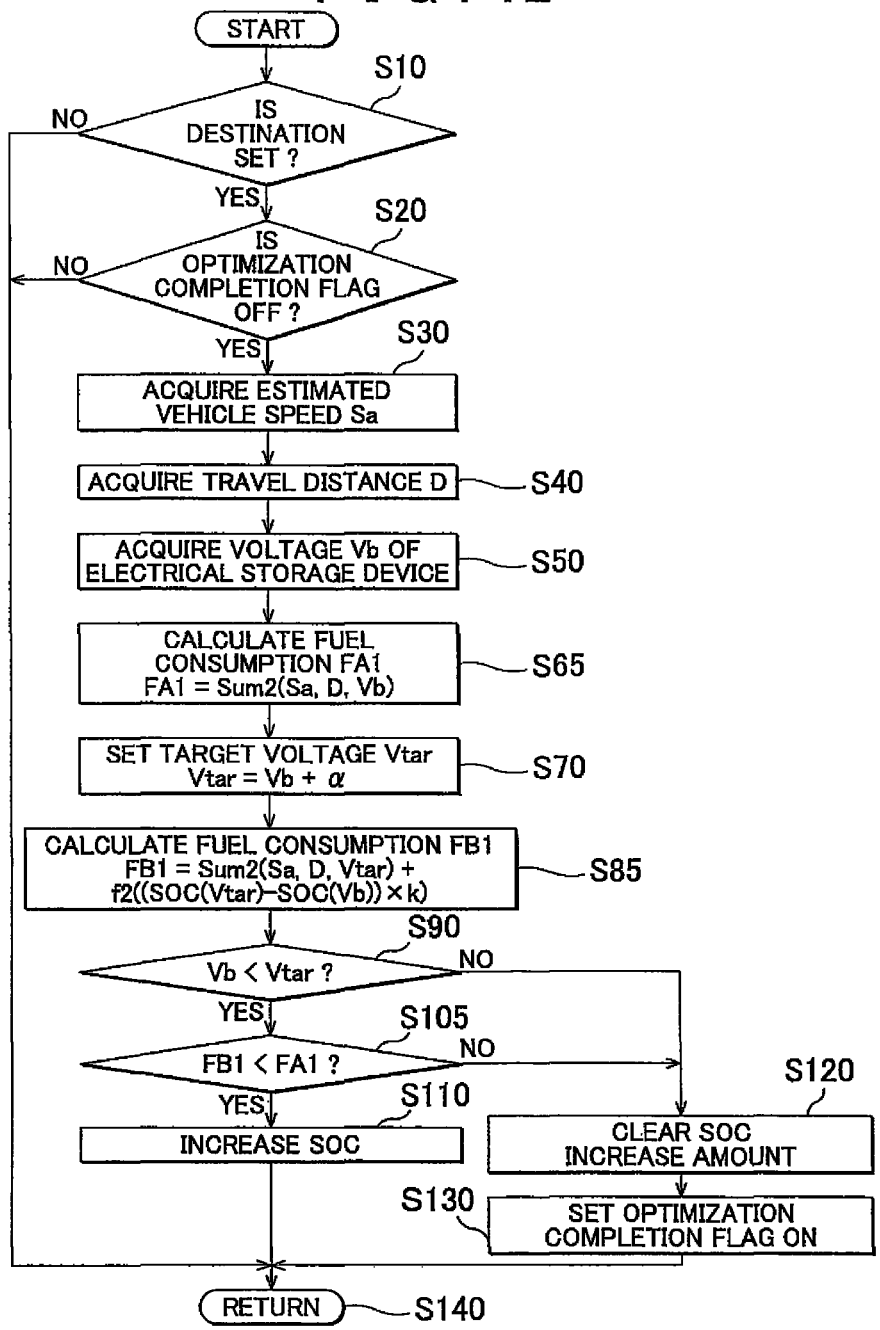

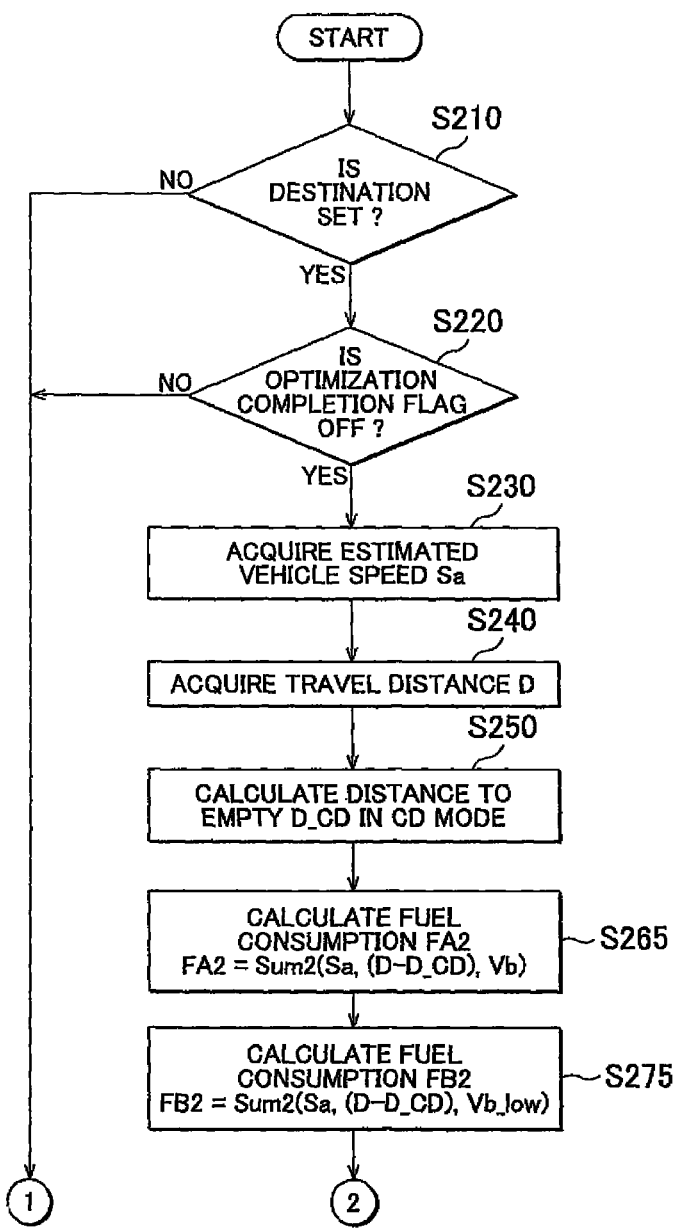

CONTROL DEVICE FOR HYBRID VEHICLE, AND HYBRID VEHICLE EQUIPPED WITH CONTROL DEVICE

BACKGROUND OF THE INVENTION

1. Field of the Invention

The invention relates to a control device for a hybrid vehicle that includes an internal combustion engine and a driving electric motor, and a hybrid vehicle equipped with the control device and, more particularly, to a control device for a hybrid vehicle that further includes a voltage step-up device that steps up an input voltage of a driving device for driving a driving electric motor to a voltage of an electrical storage device or above, and a hybrid vehicle equipped with the control device.

2. Description of Related Art

Japanese Patent Application Publication No. 2005-180255 (JP-A-2005-180255) describes a control device for a hybrid vehicle equipped with a motor generator that selectively functions as any one of a driving motor for assisting driving force of an engine and a generator that is driven by the engine. In the control device, a target storage amount of an electrical storage device that serves as an electric power supply source to the motor generator is corrected to a larger value when it has been detected that a traveling road is a limited highway or an expressway than when it has not been detected that the traveling road is a limited highway or an expressway. This prevents insufficient power supply from the electrical storage device while the hybrid vehicle is traveling on a limited highway or an expressway.

When a hybrid vehicle is provided with a voltage step-up device that steps up an input voltage of a driving device for driving a driving electric motor to a voltage of an electrical storage device or above, it is necessary to study a reduction in the carbon dioxide (hereinafter, referred to as "$CO_2$") emissions and a reduction in the fuel consumption in consideration of a loss in the voltage step-up device. JP-A-2005-180255 has not studied this point.

SUMMARY OF THE INVENTION

The invention provides a control device for a hybrid vehicle that reduces the $CO_2$ emissions and the fuel consumption in consideration of a loss in a voltage step-up device, and a hybrid vehicle equipped with the control device.

A first aspect of the invention relates to a control device for a hybrid vehicle. The control device includes an evaluation unit and a state-of-charge control unit. The hybrid vehicle includes an internal combustion engine, a driving electric motor, a driving device that drives the driving electric motor, a rechargeable electrical storage device and a voltage step-up device. The voltage step-up device is provided between the driving device and the electrical storage device, and steps up an input voltage of the driving device to a voltage of the electrical storage device or above. Then, the evaluation unit determines whether it is possible to reduce a $CO_2$ emissions for a predetermined travel route by increasing the voltage of the electrical storage device. The state-of-charge control unit controls a state of charge (hereinafter, referred to as "SOC") of the electrical storage device on the basis of a result determined by the evaluation unit.

When the evaluation unit determines that it is possible to reduce the $CO_2$ emissions, the state-of-charge control unit may control the SOC so as to increase the SOC at a start of the travel route.

The evaluation unit may include first and second computing units and a determining unit. The first computing unit may estimate a first emission amount indicating the $CO_2$ emissions if the hybrid vehicle travels the travel route without increasing the SOC. The second computing unit may estimate a second emission amount indicating the $CO_2$ emissions if the hybrid vehicle travels the travel route by increasing the SOC at the start of the travel route. The determining unit may determine that it is possible to reduce the $CO_2$ emissions when the second emission amount is smaller than the first emission amount.

The evaluation unit may calculate the $CO_2$ emissions on the basis of a vehicle speed, a voltage of the electrical storage device and a travel distance.

The evaluation unit may determine whether it is possible to reduce a fuel consumption of the internal combustion engine, instead of the $CO_2$ emission.

When the evaluation unit determines that it is possible to reduce the fuel consumption, the state-of-charge control unit may control the SOC so as to increase the SOC at a start of the travel route.

A second aspect of the invention relates to a control device for a hybrid vehicle. The control device includes a drive mode control unit and an evaluation unit. The hybrid vehicle includes an internal combustion engine, a driving electric motor, a driving device that drives the driving electric motor, a rechargeable electrical storage device and a voltage step-up device. The voltage step-up device is provided between the driving device and the electrical storage device, and steps up an input voltage of the driving device to a voltage of the electrical storage device or above. The drive mode control unit controls switching of a drive mode that includes a first mode (CD mode) in which the internal combustion engine is stopped and the hybrid vehicle is preferentially caused to drive using only the driving electric motor and a second mode (CS mode) in which the internal combustion engine is operated to keep an SOC of the electrical storage device at a predetermined target. The evaluation unit that, when the hybrid vehicle travels a predetermined travel route in the first or second mode, determines whether it is possible to reduce a $CO_2$ emissions for the travel route by preceding the second mode over the first mode in order to keep the voltage of the electrical storage device at a relatively high level. Then, the drive mode control unit controls switching of the drive mode on the basis of a result determined by the evaluation unit.

When the evaluation unit determines that it is possible to reduce the $CO_2$ emissions, the drive mode control unit may set the drive mode to the second mode until a remaining distance of the travel route is shorter than a distance to empty in the first mode.

The evaluation unit may include first and second computing units and a determining unit. The first computing unit may estimate a first emission amount indicating the $CO_2$ emissions if the hybrid vehicle travels in the first mode after the hybrid vehicle travels in the second mode when the hybrid vehicle travels the travel route. The second computing unit may estimate a second emission amount indicating the $CO_2$ emissions if the hybrid vehicle travels in the second mode after the hybrid vehicle travels in the first mode when the hybrid vehicle travels the travel route. The determining unit may determine that it is possible to reduce the $CO_2$ emissions when the second emission amount is smaller than the first emission amount.

The evaluation unit may calculate the $CO_2$ emissions on the basis of a vehicle speed, a voltage of the electrical storage device and a travel distance.

The evaluation unit may determine whether it is possible to reduce a fuel consumption of the internal combustion engine, instead of the CO2 emission.

When the evaluation unit determines that it is possible to reduce the fuel consumption, the drive mode control unit may set the drive mode to the second mode until a remaining distance of the travel route is shorter than a distance to empty in the first mode.

The hybrid vehicle may further include a charging device. The charging device may be configured to charge the electrical storage device with electric power supplied from a power supply outside the vehicle. Then, the drive mode control unit may set the drive mode to the first mode after the electrical storage device is charged by the charging device.

The evaluation unit may determine whether it is possible to reduce the carbon dioxide emissions in comparison with a case where the hybrid vehicle travels the predetermined travel route while the state of charge of the electrical storage device is controlled to a predetermined target without increasing the voltage of the electrical storage device.

The vehicle may further include a car navigation system, and the evaluation unit may acquire the predetermined travel route from a travel route set in the car navigation system.

A hybrid vehicle may include any one of the above described control devices.

According to the aspects of the invention, the voltage step-up device is provided between the electrical storage device and the driving device, and a loss in the voltage step-up device may be reduced as the voltage of the electrical storage device increases, so, as a result, the fuel economy can be improved. Then, according to the aspects of the invention, it is determined whether it is possible to reduce CO2 emissions or a fuel consumption for the predetermined travel route by increasing the voltage of the electrical storage device, and the SOC of the electrical storage device is controlled on the basis of the determined result. Alternatively, when the hybrid vehicle travels the predetermined travel route in the first mode (CD mode) or the second mode (CS mode), it is determined whether it is possible to reduce CO2 emissions or a fuel consumption for the travel route by preceding the second mode over the first mode in order to keep the voltage of the electrical storage device at a relatively high level, and switching of the drive mode is controlled on the basis of the determined result.

Thus, according to the aspects of the invention, it is possible to reduce CO2 emissions or a fuel consumption in consideration of a loss in the voltage step-up device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a flowchart for illustrating the procedure of processes executed by an HV-ECU according to a third embodiment;

FIGS. 13A and 13B are flowcharts for illustrating the procedure of processes executed by an HV-ECU according to a fourth embodiment.

DETAILED DESCRIPTION OF EMBODIMENTS

Figure 1:
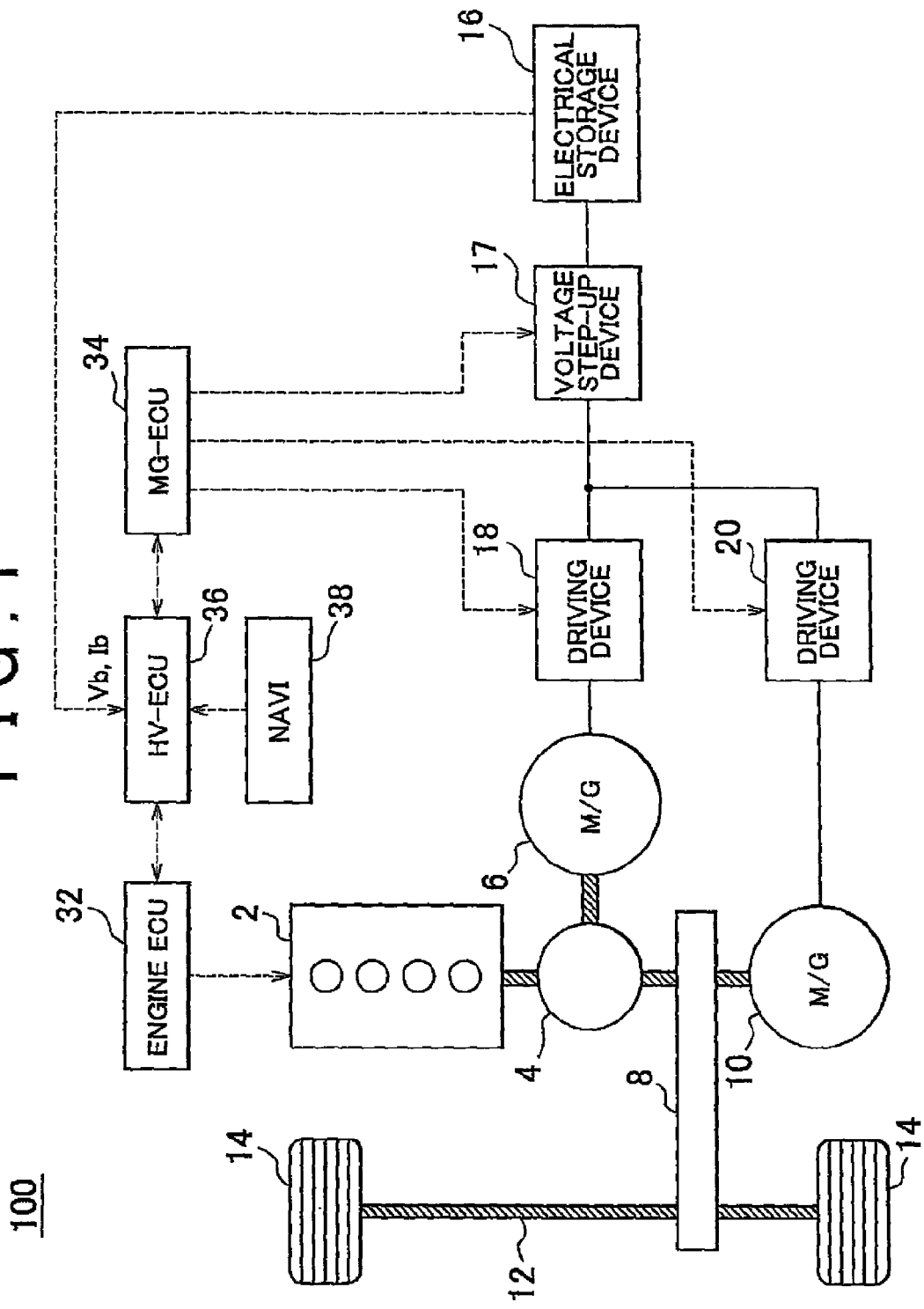
FIG. 1 is an overall block diagram of a hybrid vehicle illustrated as an example of a vehicle equipped with a control device according to a first embodiment of the invention.

Hereinafter, embodiments of the invention will be described in detail with reference to the accompanying drawings. Note that like reference numerals denote the same or corresponding components in the drawings and the description thereof is not repeated.

First Embodiment

FIG. 1 is an overall block diagram of a hybrid vehicle that is illustrated as an example of a vehicle equipped with a control device according to a first embodiment of the invention. As shown in FIG. 1, the hybrid vehicle 100 includes an engine 2, a power split unit 4, motor generators 6 and 10, a reduction gear 8, drive shafts 12 and wheels 14. In addition, the hybrid vehicle 100 further includes an electrical storage device 16, a voltage step-up device 17, driving devices 18 and 20, an engine electronic control unit (ECU) 32, an MG-ECU 34, an HV-ECU 36 and a car navigation system 38.

The engine 2 converts thermal energy generated through combustion of fuel, such as gasoline and light oil, to the kinetic energy of a kinetic element, such as a piston and a rotor, and then outputs the converted kinetic energy to the power split unit 4. The power split unit 4 is coupled to the engine 2, the motor generator 6 and the reduction gear 8, and distributes power among these components. For example, a planetary gear unit having three rotary shafts of a sun gear, a planetary carrier and a ring gear may be used as the power split unit 4, and these three rotary shafts are respectively connected to the rotary shaft of the engine 2, the rotary shaft of the motor generator 6 and the input shaft of the reduction gear 8. The rotary shaft of the motor generator 10 is coupled to the input shaft of the reduction gear 8.

Kinetic energy generated by the engine 2 is distributed by the power split unit 4 to the motor generator 6 and the reduction gear 8. That is, the engine 2 is assembled to the hybrid vehicle 100 as a power source that drives the drive shafts 12 and also drives the motor generator 6. The motor generator 6 operates as a generator that is driven by the engine 2. In addition, the motor generator 6 also operates as an electric motor that starts the engine 2. The motor generator 10 is assembled to the hybrid vehicle 100 as a power source that drives the drive shafts 12.

The electrical storage device 16 is a rechargeable direct-current power supply that stores electric power for propelling the vehicle. The electrical storage device 16 is, for example, formed of a secondary battery, such as a nickel metal hydride battery and a lithium ion battery. The electrical storage device 16 supplies electric power to the voltage step-up device 17. In addition, the electrical storage device 16 is charged with electric power received from the voltage step-up device 17 while the motor generators 6 and/or 10 are generating electric power. Note that a large-capacity capacitor may be employed as the electrical storage device 16, and the electrical storage device 16 may be any electric power buffer that is able to temporarily store electric power generated by the motor generators 6 and 10 and supply the stored electric power to the motor generators 6 and 10.

The voltage step-up device 17 is provided between the electrical storage device 16 and the driving devices 18 and 20. Then, the voltage step-up device 17 steps up the input voltages of the driving devices 18 and 20 to the voltage of the electrical storage device 16 or above on the basis of a control signal from the MG-ECU 34. The voltage step-up device 17 is, for example, formed of a current reversible step-up chopper circuit.

The driving device 18 converts electric power generated by the motor generator 6 to direct-current electric power and then outputs the direct-current electric power to the voltage step-up device 17. The driving device 20 converts direct-current electric power received from the voltage step-up device 17 to alternating-current electric power and then outputs the alternating-current electric power to the motor generator 10. Note that, when the engine 2 is started, the driving device 18 converts direct-current electric power received form the voltage step-up device 17 to alternating-current electric power and then outputs the alternating-current electric power to the motor generator 6. In addition, when the vehicle is braking or decelerating on a downward slope, the driving device 20 converts electric power generated by the motor generator 10 to direct-current electric power and then outputs the direct-current electric power to the voltage step-up device 17. Note that each of the driving devices 18 and 20 is, for example, formed of a three-phase pulse width modulation (PWM) inverter that includes switching elements of three phases.

Each of the motor generators 6 and 10 is an alternating-current electric motor and is, for example, a three-phase alternating-current synchronous motor in which a permanent magnet is embedded in a rotor. The motor generator 6 converts kinetic energy generated by the engine 2 to electric energy and then outputs the electric energy to the driving device 18. In addition, the motor generator 6 generates driving force using three-phase alternating-current electric power received from the driving device 18 to start the engine 2. The motor generator 10 generates driving torque of the vehicle using three-phase alternating-current electric power received from the driving device 20. In addition, when the vehicle is braking or decelerating on a downward slope, the motor generator 10 converts mechanical energy stored in the vehicle as kinetic energy or potential energy to electric energy and then outputs the electric energy to the driving device 20.

The engine ECU 32 generates a driving signal for driving the engine 2 and then outputs the generated driving signal to the engine 2 on the basis of an operation command from the HV-ECU 36. The MG-ECU 34 generates driving signals for driving the motor generators 6 and 10 and then outputs the generated driving signals to the driving devices 18 and 20 on the basis of operation commands from the HV-ECU 36.

The HV-ECU 36 generates operation commands for the engine 2 and the motor generators 6 and 10 on the basis of an operating state of the vehicle and then outputs the generated operation commands to the engine ECU 32 and the MG-ECU 34. In addition, the HV-ECU 36 generates the operation commands for the engine 2 and the motor generator 6 so that the SOC of the electrical storage device 16 coincides with a target value or falls within a target range, and then outputs the generated operation commands to the engine ECU 32 and the MG-ECU 34.

Furthermore, when a destination is set in the car navigation system 38, the HV-ECU 36 determines whether it is possible to reduce the $CO_2$ emissions for a travel route to the destination by increasing the voltage of the electrical storage device 16. In terms of this point, the hybrid vehicle 100 includes the voltage step-up device 17, and, as the voltage of the electrical storage device 16 increases, a load on the voltage step-up device 17 is reduced, and a loss in the voltage step-up device 17 reduces. By so doing, the fuel economy improves and, as a result; the $CO_2$ emissions may be reduced.

Then, in the first embodiment, the HV-ECU 36 uses a prepared fuel consumption map (described later) to determine whether it is possible to reduce the $CO_2$ emissions for a travel route to the destination by increasing the voltage of the electrical storage device 16. Then, the HV-ECU 36 controls the SOC of the electrical storage device 16 on the basis of the determined result. That is, when it is determined that it is possible to reduce the $CO_2$ emissions, the HV-ECU 36 controls the SOC of the electrical storage device 16 so as to increase the SOC in order to increase the voltage of the electrical storage device 16. Note that determination as to whether it is possible to reduce the $CO_2$ emissions for a travel route and SOC control based on the determined result are desirably executed at the start of the travel route. Note that the configuration of the HV-ECU 36 will be described in detail later.

When a destination is set by a user, the car navigation system 38 outputs a travel distance to the destination to the HV-ECU 36. In addition, the car navigation system 38 outputs an estimated vehicle speed in the travel route to the destination (for example, a speed limit of the travel route) to the HV-ECU 36. These pieces of information are used by the HV-ECU 36 to calculate the $CO_2$ emissions for the travel route (described later).

Figure 2:
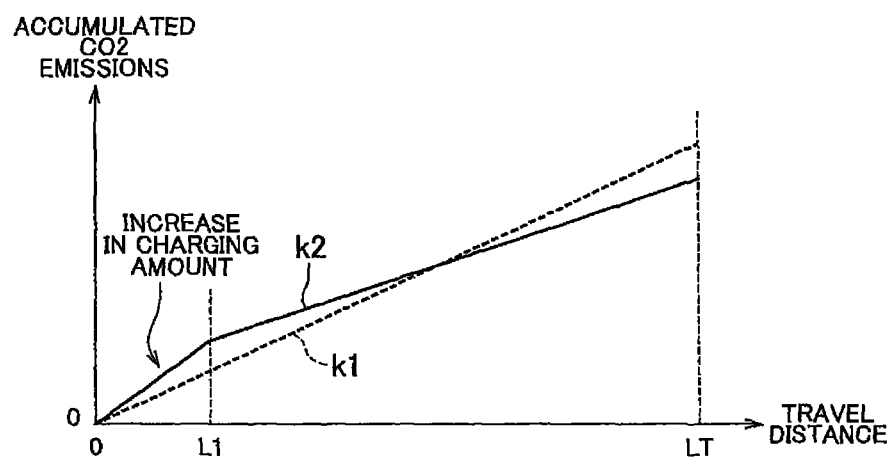
FIG. 2 is a graph for illustrating the concept of reducing the CO2 emissions according to the first embodiment.

FIG. 2 is a graph for illustrating the concept of reducing the $CO_2$ emissions according to the first embodiment. As shown in FIG. 2, the abscissa axis represents a travel distance along a predetermined travel route. Although not shown in the drawing, a travel distance may be replaced with a travel time. The ordinate axis represents accumulated $CO_2$ emissions if the vehicle travels the travel route. Note that the predetermined travel route may be, for example, a route to a destination that is a travel distance LT away from a travel start point (travel distance 0) set at home or may be an expressway travel route when an expressway is used. In the following description, the case where a travel route is set from a travel start point, such as home, to a destination set in the car navigation system 38 (FIG. 1) will be typically described.

In FIG. 2, the dotted line k1 indicates the accumulated $CO_2$ emissions through control according to a comparative embodiment. The dotted line k1 indicates the accumulated $CO_2$ emissions if the vehicle travels the predetermined route while the SOC is controlled to a predetermined target without increasing the voltage of the electrical storage device 16.

On the other hand, the solid line k2 indicates the accumulated $CO_2$ emissions according to the first embodiment. That is, the solid line k2 indicates the accumulated $CO_2$ emissions if the vehicle travels the predetermined route after the SOC of the electrical storage device 16 is increased at the start of travel in order to increase the voltage of the electrical storage device 16. In the solid line k2, the engine 2 is operated until the vehicle reaches a travel distance L1 in order to increase the SOC of the electrical storage device 16, so the CO2 emissions are larger than the CO2 emissions through control according to the comparative embodiment indicated by the dotted line k1.

However, after the vehicle, has reached the travel distance L1, because the voltage of the electrical storage device 16 is increased, a loss in the voltage step-up device 17 is reduced and, as a result, the operation frequency of the engine 2 reduces as compared with the control (dotted line k1) according to the comparative embodiment to thereby suppress the CO2 emission. Then, even when an increase in the CO2 emissions because the engine 2 is operated in order to increase the SOC at the start of travel is taken into consideration, the accumulated CO2 emissions for the travel route may be reduced as compared with the control according to the comparative embodiment in total.

Then, in the first embodiment, it is determined whether it is possible to reduce the CO2 emissions for a travel route by increasing the voltage, of the electrical storage device 16 at the start of travel and, when it is determined that it is possible to reduce the CO2 emissions, the SOC of the electrical storage device 16 is controlled so as to increase the SOC at the start of the travel route.

Figure 3:
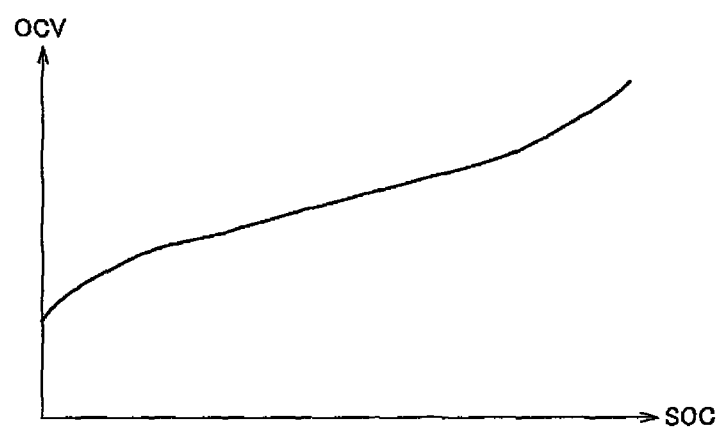
FIG. 3 is a graph that shows the correlation between the SOC and OCV of an electrical storage device.

Note that, as shown in FIG. 3, the correlation between the SOC and open circuit voltage (OCV) of the electrical storage device 16 is that the OCV increases as the SOC increases, so the voltage of the electrical storage device 16 may be increased by increasing the SOC.

Figure 4:
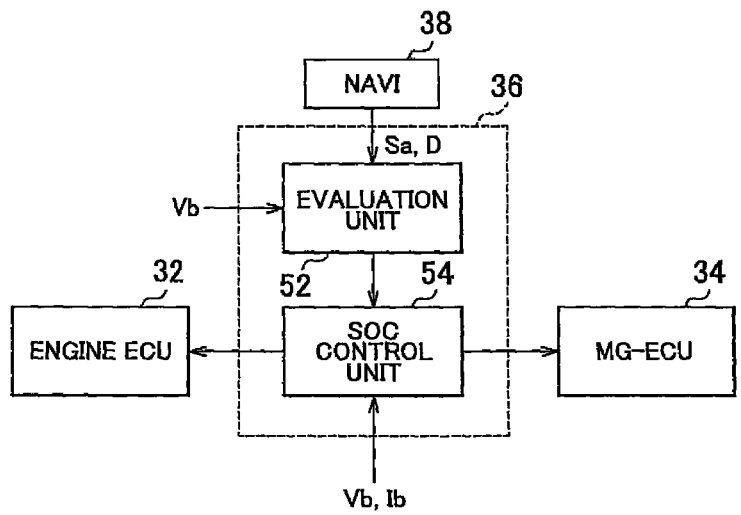
FIG. 4 is a functional block diagram of an HV-ECU shown in FIG. 1.

FIG. 4 is a functional block diagram of the HV-ECU 36 shown in FIG. 4. Note that FIG. 4 shows only the characterized functions according to the embodiment of the invention among the functions of the HV-ECU 36. As shown in FIG. 4, the HV-ECU 36 includes an evaluation unit 52 and an SOC control unit 54.

The evaluation unit 52 receives the voltage Vb of the electrical storage device 16, detected by a voltage sensor (not shown). In addition, the evaluation unit 52 receives a travel distance D to a destination set by the user in the car navigation system 38 and an estimated vehicle speed Sa in a travel route to the destination (for example, a speed limit of the travel route to the destination) from the car navigation system 38.

Then, the evaluation unit 52 determines on the basis of the received values whether it is possible to reduce the CO2 emissions for the travel route by increasing the voltage Vb of the electrical storage device 16. More specifically, the evaluation unit 52 initially calculates CO2 emissions used as a determination reference, that is, CO2 emissions CA1 if the vehicle travels the travel route without increasing the voltage Vb of the electrical storage device 16 (that is, without increasing the SOC). As for a specific method of calculating the CO2 emissions CA1, the evaluation unit 52, for example, uses a prepared fuel consumption map to calculate an instantaneous fuel consumption on the basis of the voltage Vb of the electrical storage device 16 and the estimated vehicle speed Sa.

Figure 5:
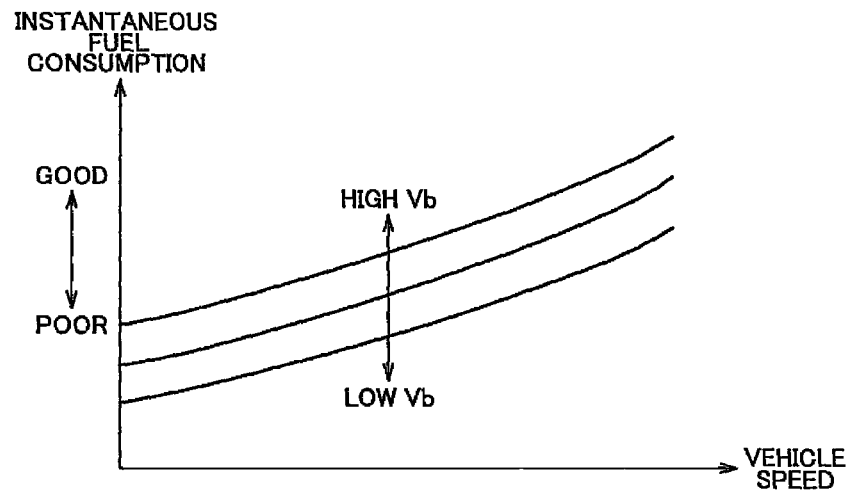
FIG. 5 is a graph that shows an example of a fuel consumption map.

FIG. 5 is a graph that shows an example of the fuel consumption map. As shown in FIG. 5, the abscissa axis represents a vehicle speed, and the ordinate axis represents an instantaneous fuel consumption. As the value of the ordinate axis increases, the fuel economy increases. As described above, as the voltage of the electrical storage device 16 increases, a loss in the voltage step-up device 17 reduces, so the instantaneous fuel consumption is small. In addition, as the vehicle speed increases, the instantaneous fuel consumption reduces.

Referring back to FIG. 4, the evaluation unit 52 multiplies the instantaneous fuel consumption, obtained from the consumption map, by the travel distance D to thereby calculate the fuel consumption for the travel route. Then, the evaluation unit 52, for example, uses a predetermined conversion factor to calculate CO2 emissions from the calculated fuel consumption. When a series of these computations are denoted by Sum1, the CO2 emissions CA1 are expressed by the following mathematical expression.

$$CO2 \text{ emissions } CA1 = \text{Sum1}(Sa, D, Vb) \quad (1)$$

Subsequently, the evaluation unit 52 calculates CO2 emissions CB1 if the vehicle travels the travel route by increasing the voltage Vb of the electrical storage device 16 (that is, by increasing the SOC). As for a specific method of calculating the CO2 emissions CB1, the evaluation unit 52, for example, calculates CO2 emissions in order to increase the voltage of the electrical storage device 16 to Vtar (=Vb+α) using a prepared function f1. The function f1 is to estimate an energy amount required to increase the voltage Vb to Vtar by, for example, multiplying an increase in the SOC by an efficiency coefficient k of a path from the engine 2 to the electrical storage device 16 and then to calculate a CO2 amount from the estimated energy amount using a predetermined conversion factor, or the like. Then, the evaluation unit 52 adds the calculated CO2 emissions to the CO2 emissions when the vehicle travels if the voltage of the electrical storage device 16 is increased to Vtar (=Vb+α) to thereby calculate the CO2 emissions CB1. That is, the CO2 emissions CB1 may be calculated by the following mathematical expression.

$$CO2 \text{ emissions } CB1 = \text{Sum1}(Sa, D, Vtar) + f1((SOC(Vtar) - SOC(Vb)) \times k) \quad (2)$$

Note that α that denotes an increase in the voltage of the electrical storage device 16 is, for example, determined by an SOC upper limit value of the electrical storage device 16, or the like.

Then, the evaluation unit 52 compares the CO2 emissions CB1 with the CO2 emissions CA1. When the CO2 emissions CB1 are smaller than the CO2 emissions CA1, the evaluation unit 52 determines that it is possible to reduce the CO2 emissions by increasing the voltage Vb.

The SOC control unit 54 calculates the SOC of the electrical storage device 16 on the basis of the detected voltage Vb and current Ib of the electrical storage device 16. Then, the SOC control unit 54 generates operation commands for the engine 2 and the motor generator 6 so as to control the SOC of the electrical storage device 16 to a predetermined target, and then outputs the generated operation commands to the engine ECU 32 and the MG-ECU 34.

Here, as the SOC control unit 54 receives, from the evaluation unit 52, a notification that it is possible to reduce the CO2 emissions by increasing the voltage Vb, the SOC control unit 54 increases the target SOC of the electrical storage device 16 by a predetermined amount. Note that the increased amount is, for example, determined in advance on the basis of an allowable input electric power Win, an SOC upper limit value, or the like. The allowable input electric power Win indicates a maximum electric power that may be input to the electrical storage device 16.

Figure 6:
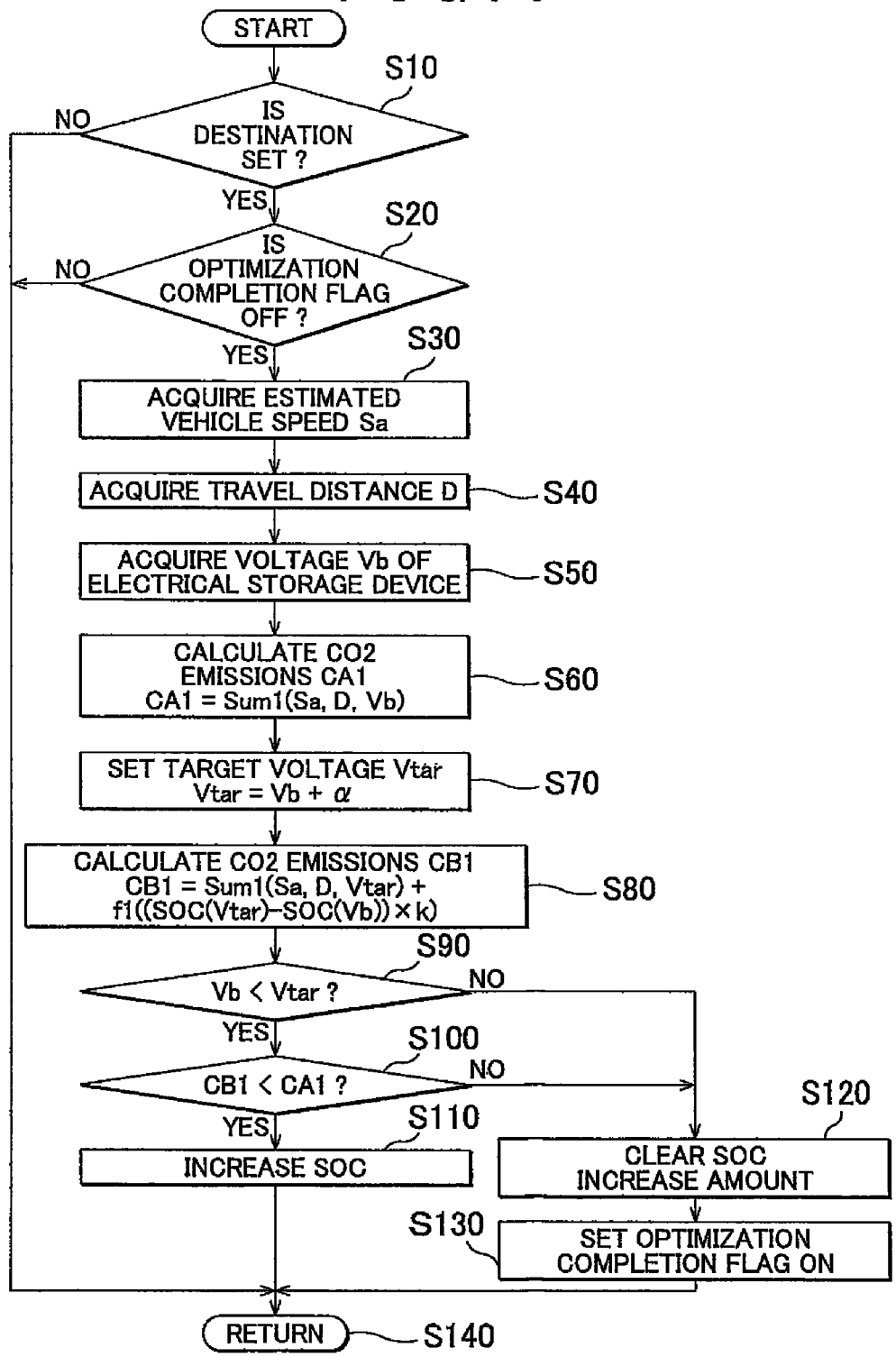
FIG. 6 is a flowchart for illustrating the procedure of processes executed by the HV-ECU.

FIG. 6 is a flowchart for illustrating the procedure of processes executed by the HV-ECU 36. Note that the processes shown in the flowchart are called from a main routine and executed at constant time intervals or each time a predetermined condition is satisfied.

As shown in FIG. 6, the HV-ECU 36 determines whether a destination is set by the user in the car navigation system 38 (step S10). When it is determined that a destination is not set (NO in step S10), the HV-ECU 36 proceeds with the process to step S140 without executing the following series of processes.

When it is determined in step S10 that the destination is set (YES in step S10), the HV-ECU 36 determines whether an optimization completion flag for determining whether to execute the following processes is off (step S20). Then, when it is determined that the optimization completion flag is on (NO in step S20), the HV-ECU 36 proceeds with the process to step S140 without executing the following processes.

When it is determined in step S20 that the optimization completion flag is off (YES in step S20), the HV-ECU 36 acquires the estimated vehicle speed Sa in the travel route to the destination set by the user in the car navigation system 38 from the car navigation system 38 (step S30). In addition, the HV-ECU 36 acquires the travel distance D to the destination set by the user in the car navigation system 38 from the car navigation system 38 (step S40). Furthermore, the HV-ECU 36 acquires the detected voltage Vb of the electrical storage device 16 (step S50).

Then, the HV-ECU 36 uses the estimated vehicle speed Sa acquired in step S30, the travel distance D acquired in step S40 and the voltage Vb of the electrical storage device 16 acquired in step S50 to calculate the CO2 emissions CA1 if the vehicle travels to the destination without increasing the voltage Vb of the electrical storage device 16 (that is, without increasing the SOC) using the above described mathematical expression (1) (step S60).

Subsequently, the HV-ECU 36 sets Vb+α (α is a positive value) for the target voltage Vtar if the voltage of the electrical storage device 16 is increased (step S70). Note that the increase amount α is, for example, determined by the SOC upper limit value of the electrical storage device 16, or the like. Then, the HV-ECU 36 uses the estimated vehicle speed Sa, the travel distance D, the voltage Vb and the target voltage Vtar set in step S70 to calculate the CO2 emissions CB1 if the vehicle travels to the destination by increasing the voltage Vb of the electrical storage device 16 to the target voltage Vtar (that is, by increasing the SOC) using the above described mathematical expression (2) (step S80).

Subsequently, the HV-ECU 36 determines whether the voltage Vb acquired in step S50 is lower than the target voltage Vtar (step S90). When it is determined that the voltage Vb is lower than the target voltage Vtar (YES in step S90), the HV-ECU 36 determines whether the CO2 emissions CB1 calculated in step S80 are smaller than the CO2 emissions CA1 calculated in step S60 (step S100). Then, when it is determined that the CO2 emissions CB1 are smaller than the CO2 emissions CA1 (YES in step S100), the HV-ECU 36 controls the SOC of the electrical storage device 16 so as to increase the SOC (step S110).

On the other hand, when it is determined in step S90 that the voltage Vb is higher than or equal to the target voltage Vtar (NO in step S90) or when it is determined in step S100 that the CO2 emissions CB1 are larger than or equal to the CO2 emissions CA1 (NO in step S100), the HV-ECU 36 clears the increase amount if the SOC is increased (step S120). Then, the HV-ECU 36 sets the optimization completion flag on (step S130).

As described above, in the first embodiment, the voltage step-up device 17 is provided between the electrical storage device 16 and the driving devices 18 and 20, and a loss in the voltage step-up device 17 may be reduced as the voltage of the electrical storage device 16 increases, so, as a result, the fuel economy can improve. Then, in the first embodiment, it is determined whether it is possible to reduce a CO2 emissions for a predetermined travel route by increasing the voltage of the electrical storage device 16, and then the SOC of the electrical storage device is controlled on the basis of the determined result. Thus, according to the first embodiment, it is possible to reduce the CO2 emissions in consideration of a loss in the voltage step-up device 17.

Second Embodiment

Figure 7:
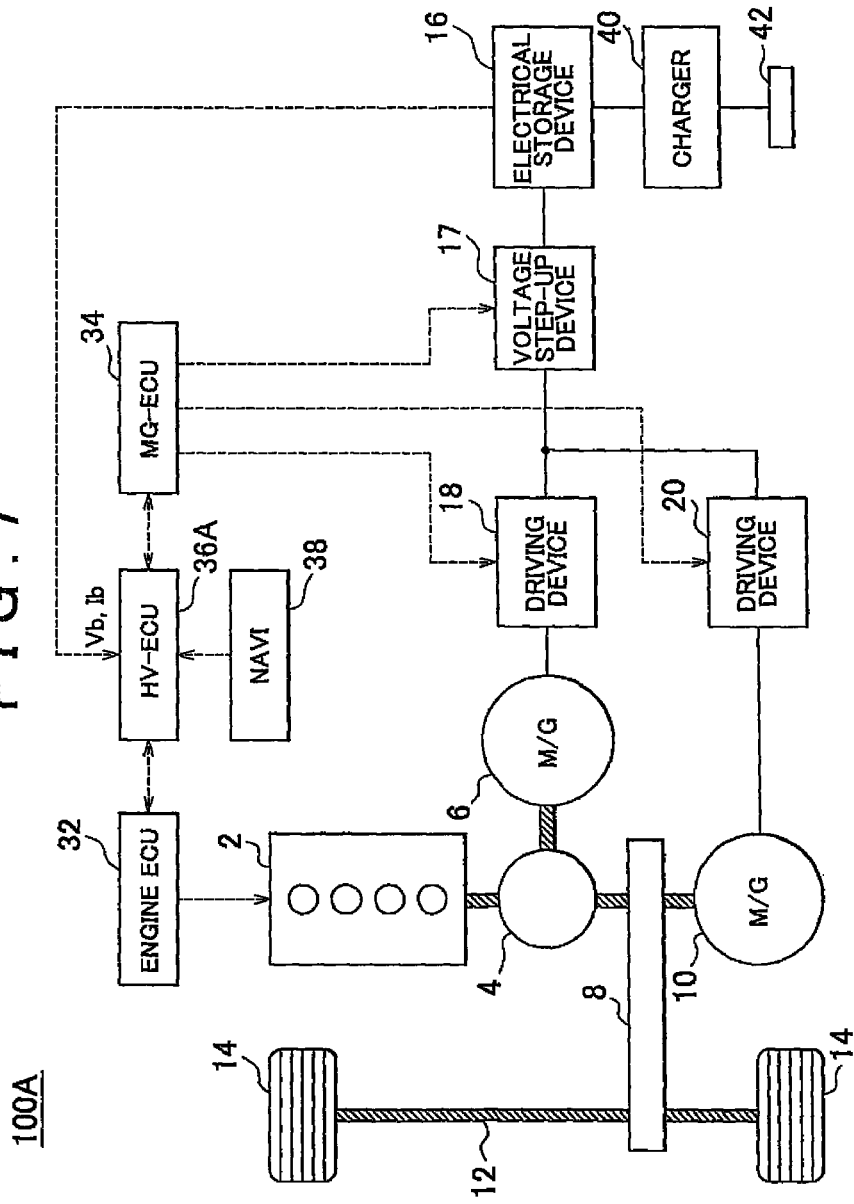
FIG. 7 is an overall block diagram of a hybrid vehicle illustrated as an example of a vehicle equipped with a control device according to a second embodiment.

FIG. 7 is an overall block diagram of a hybrid vehicle that is illustrated as an example of a vehicle equipped with a control device according to a second embodiment. As shown in FIG. 7, the hybrid vehicle 100A further includes a charger 40 and an inlet 42 in addition to the configuration of the hybrid vehicle 100 according to the first embodiment shown in FIG. 1, and includes an HV-ECU 36A instead of the HV-ECU 36.

The charger 40 receives electric power, supplied from a power supply (not shown) outside the vehicle, via the inlet 42, converts the received electric power into the voltage level of the electrical storage device 16 and then outputs the converted electric power to the electrical storage device 16. The inlet 42 is a power receiving port that receives electric power supplied from a power supply outside the vehicle when the electrical storage device 16 is charged by the power supply.

The HV-ECU 36A controls switching of a drive mode. Specifically, the HV-ECU 36A controls switching between a charge depleting (CD) mode and a charge sustaining (CS) mode. In the CD mode, the engine 2 is stopped and the hybrid vehicle 100A is preferentially caused to drive using only the motor generator 10. In the CS mode, the engine 2 is operated to keep the SOC of the electrical storage device 16 at a predetermined target.

Note that, even in the CD mode, the operation of the engine 2 is allowed when an accelerator pedal is depressed by the driver by a large amount, when an engine-driven air conditioner is in operation, when the engine is warmed up, or the like. The CD mode is a drive mode in which the SOC of the electrical storage device 16 is not kept and basically the vehicle is caused to drive using electric power stored in the electrical storage device 16 as an energy source. During the CD mode, there are many cases that the proportion of discharging is relatively larger than the proportion of charging eventually. On the other hand, the CS mode is a drive mode in which electric power is generated by the motor generator 6 by operating the engine 2 where necessary in order to keep the SOC of the electrical storage device 16 at a predetermined target, and is not limited to a drive mode in which the vehicle is caused to drive while the engine 2 is constantly operated. That is, even when the drive mode is the CD mode, the engine 2 is operated when the accelerator pedal is depressed by a large amount and large vehicle power is required. In addition, even when the drive mode is the CS mode, the engine 2 is stopped when the SOC exceeds the target value.

The HV-ECU 36A sets the drive mode to the CD mode after the electrical storage device 16 is charged by the charger 40. In addition, as a destination is set in the car navigation system 38, the HV-ECU 36A determines whether it is possible to reduce the CO2 emissions for the travel route to the destination by preceding the CS mode over the CD mode in order to keep the voltage of the electrical storage device 16 at a relatively high level. In terms of this point, as the voltage of the electrical storage device 16 increases, a load on the voltage step-up device 17 is reduced, and a loss in the voltage step-up device 17 reduces, as described above. By so doing, the fuel economy improves and, as a result, the CO2 emissions may be reduced.

Then, in the second embodiment, when the vehicle travels the travel route to the destination in the CD mode or in the CS mode, the HV-ECU 36A uses the prepared fuel consumption map (FIG. 5) to determine whether it is possible to reduce the $CO_2$ emissions for the travel route to the destination by preceding the CS mode over the CD mode. Then, the HV-ECU 36A controls switching of the drive mode on the basis of the determined result. That is, when it is determined that it is possible to reduce the $CO_2$ emissions, the HV-ECU 36A sets the drive mode to the CS mode until a remaining travel distance to the destination is shorter than a distance to empty in the CD mode in order to keep the voltage of the electrical storage device 16 as high as possible. Then, when the remaining travel distance to the destination is shorter than the distance to empty in the CD mode, the drive mode switches from the CS mode to the CD mode.

Note that the other configuration of the HV-ECU 36A is the same as that of the HV-ECU 36 according to the first embodiment shown in FIG. 1.

Figure 8:
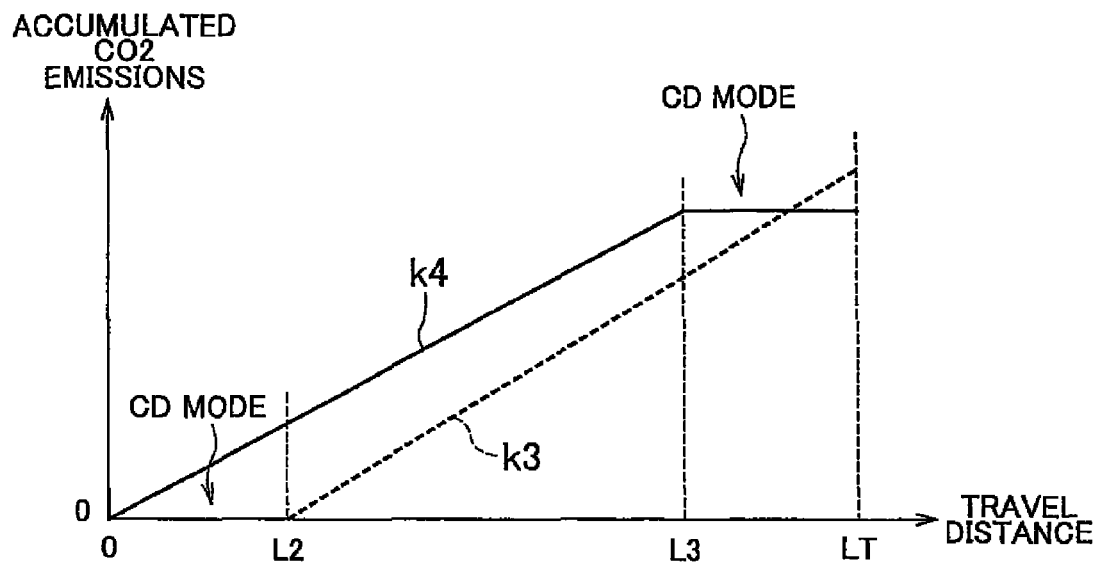
FIG. 8 is a graph for illustrating the concept of reducing the CO2 emissions according to the second embodiment.

FIG. 8 is a graph for illustrating the concept of reducing the $CO_2$ emissions according to the second embodiment. As shown in FIG. 8, the ordinate axis and the abscissa axis represent the same as those of FIG. 2. Note that, in FIG. 8, the electrical storage device 16 is charged by the charger 40 before the vehicle starts traveling the travel route. That is, the SOC of the electrical storage device 16 at the time when the vehicle starts traveling the travel route is relatively sufficiently high.

The dotted line k3 indicates accumulated $CO_2$ emissions if the vehicle travels in the CD mode from the start of travel and then travels in the CS mode from the point at a travel distance L2 at which the SOC has decreased to a predetermined lower limit value. Note that the dotted line k3 shows switching of the drive mode according to a comparative embodiment.

On the other hand, the solid line k4 indicates accumulated $CO_2$ emissions according to the second embodiment. That is, the solid line k4 indicates accumulated $CO_2$ emissions if the vehicle travels in the CS mode from the start of travel and then travels in the CD mode from the point at a travel distance L3 at which the remaining travel distance is shorter than the distance to empty in the CD mode in order to keep the voltage of the electrical storage device 16 at a relatively high level.

As for the SOC of the electrical storage device 16 while the vehicle is traveling in the CS mode, the SOC in the driving pattern of the solid line k4 is higher than the SOC in the driving pattern of the dotted line k3, so, as for the voltage of the electrical storage device 16 as well, the voltage in the driving pattern of the solid line k4 is higher than the voltage in the driving pattern of the dotted line k3. Thus, a loss in the voltage step-up device 17 is smaller in the driving pattern of the solid line k4 than in the driving pattern of the dotted line k3. As a result, the operation frequency of the engine 2 decreases, so the $CO_2$ emissions are suppressed (the solid line k4 is smaller in slope than the dotted line k3).

Then, in the second embodiment, it is determined whether it is possible to reduce the $CO_2$ emissions by preceding the CS mode over the CD mode in order to keep the voltage of the electrical storage device 16 at a relatively high level. Then, when it is determined that it is possible to reduce the $CO_2$ emissions, the CS mode is preceded over the CD mode, and, when the remaining travel distance is shorter than the distance to empty in the CD mode, the drive mode is switched to the CD mode.

Figure 9:
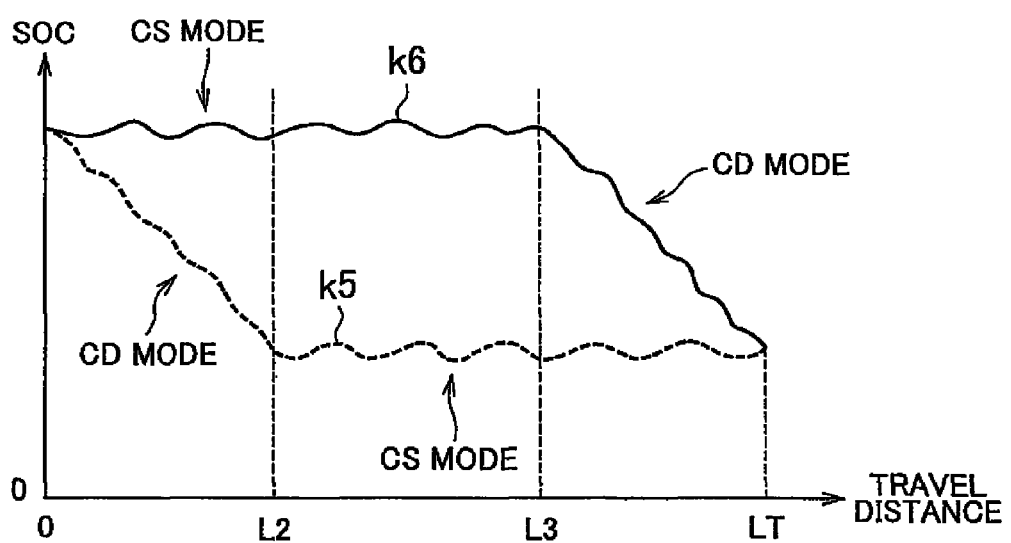
FIG. 9 is a graph that shows a change in SOC in a travel route.

FIG. 9 is a graph that shows a change in SOC in the travel route. As shown in FIG. 9, the dotted line k5 shows a change in SOC when the vehicle travels in the CD mode from the start of travel and then travels in the CS mode from the point at the travel distance L at which the SOC reaches a predetermined lower limit value. Note that the dotted line k5 corresponds to the dotted line k3 in FIG. 8.

On the other hand, the solid line k6 shows a change in SOC when the vehicle travels in the CS mode from the start of travel and then travels in the CD mode from the point at the travel distance L3 at which the remaining travel distance is shorter than the distance to empty in the CD mode in order to keep the voltage of the electrical storage device 16 at a high level. Note that the solid line k6 corresponds to the solid line k4 in FIG. 8.

In this way, by preceding the CS mode over the CD mode, the SOC and voltage of the electrical storage device 16 while the vehicle is traveling in the CS mode may be kept at a high level, and, as a result, it is possible to reduce the $CO_2$ emission. Note that when the vehicle is able to travel all the travel route only in the CD mode, it is, of course, desirable that the vehicle travels all the travel route in the CD mode.

Figure 10:
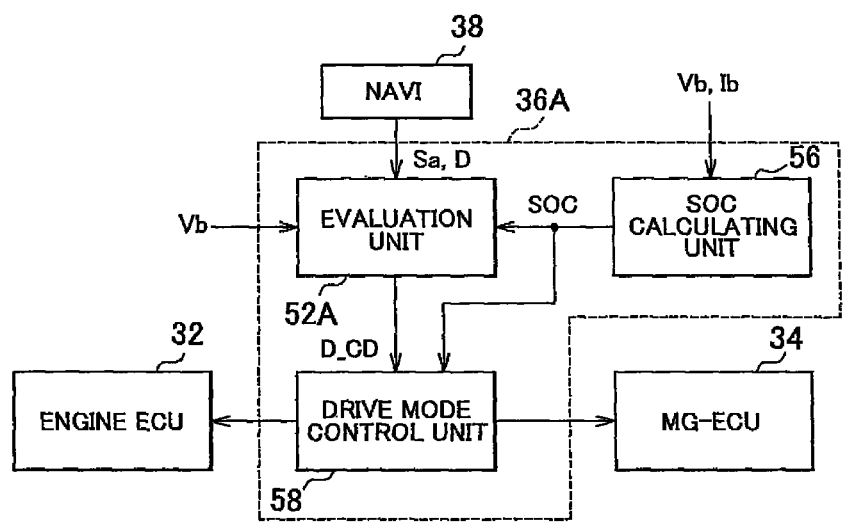
FIG. 10 is a functional block diagram of an HV-ECU shown in FIG. 7

FIG. 10 is a functional block diagram of the HV-ECU 36A shown in FIG. 7. Note that FIG. 10 also shows only the characterized functions according to the embodiment of the invention among the functions of the HV-ECU 36A. As shown in FIG. 10, the HV-ECU 36A includes an evaluation unit 52A, an SOC calculating unit 56 and a drive mode control unit 58.

The evaluation unit 52A receives the detected voltage Vb of the electrical storage device 16, and receives a travel distance D to a destination and an estimated vehicle speed Sa to the destination from the car navigation system 38. In addition, the evaluation unit 52A receives the SOC of the electrical storage device 16 from the SOC calculating unit 56, and then calculates a distance to empty D_CD in the CD mode on the basis of the received SOC. By way of example, the evaluation unit 52A divides a storage capacity calculated on the basis of the SOC by an electric power consumption (Wh/km) to calculate the distance to empty D_CD.

Then, the evaluation unit 52A determines, on the basis of those values, whether it is possible to reduce the $CO_2$ emissions for the travel route by preceding the CS mode over the CD mode. Specifically, the evaluation unit 52A calculates the $CO_2$ emissions CA2 if the vehicle travels by preceding the CS mode over the CD mode (the solid line k4 in FIG. 8 and the solid line k6 in FIG. 9) using the following mathematical expression.

$$CO_2 \text{ emissions } CA2 = \text{Sum}1(Sa, (D-D\_CD), Vb) \qquad (3)$$

Subsequently, the evaluation unit 52A calculate the $CO_2$ emissions CB2 if the vehicle travels by preceding the CD mode over the CS mode (the dotted line k3 in FIG. 8 and the dotted line k5 in FIG. 9) using the following mathematical expression.

$$CO_2 \text{ emissions } CB2 = \text{Sum}1(Sa, (D-D\_CD), Vb\_\text{low}) \qquad (4)$$

Here, Vb_low is the voltage of the electrical storage device 16 after the vehicle travels in the CD mode, that is, the voltage of the electrical storage device 16 when the SOC is the predetermined lower limit value. Then, the evaluation unit 52A compares the $CO_2$ emissions CA2 with the $CO_2$ emissions CB2. When the $CO_2$ emissions CA2 are smaller than the $CO_2$ emissions CB2, the evaluation unit 52A determines that it is possible to reduce the $CO_2$ emissions by preceding the CS mode over the CD mode.

The SOC calculating unit 56 calculates the SOC of the electrical storage device 16 on the basis of the detected voltage Vb and current Ib of the electrical storage device 16 and then outputs the calculated result to the evaluation unit 52A and the drive mode control unit 58.

After the electrical storage device 16 is charged by the charger 40, the drive mode control unit 58 sets the default of the drive mode to the CD mode. In addition, the drive mode control unit 58 receives the calculated SOC from the SOC calculating unit 56, and receives the distance to empty D_CD in the CD mode from the evaluation unit 52A. Furthermore, the drive mode control unit 58 receives a remaining travel distance D_left to the destination from the car navigation system 38 (not shown).

Then, when the drive mode control unit 58 receives, from the evaluation unit 52A, a notification that it is possible to reduce the CO2 emissions by preceding the CS mode over the CD mode, the drive mode control unit 58 sets the drive mode to the CS mode until the remaining travel distance D_left is shorter than the distance to empty D_CD in the CD mode. Then, when the remaining travel distance D_left is shorter than the distance to empty D_CD, the drive mode control unit 58 switches the drive mode to the CD mode.

Note that, when the drive mode control unit 58 has not received, from the evaluation unit 52A, a notification that it is possible to reduce the CO2 emissions, the drive mode control unit 58 causes the vehicle to start traveling the travel route in the CD mode and, when the SOC has decreased to the predetermined lower limit value, switches the drive mode to the CS mode.

Then, when the drive mode is the CS mode, the drive mode control unit 58 generates operation commands for the engine 2 and the motor generator 6, and outputs the generated operation commands to the engine ECU 32 and the MG-ECU 34. In addition, when the drive mode is the CD mode, the drive mode control unit 58 basically generates only an operation command for the motor generator 6, and outputs the generated operation command to the MG-ECU 34. Note that, when large vehicle driving force is required by depressing the accelerator pedal, or the like, even when the drive mode is the CD mode, the drive mode control unit 58 also generates an operation command for the engine 2 and outputs the operation command to the engine ECU 32.

Figure 11A:
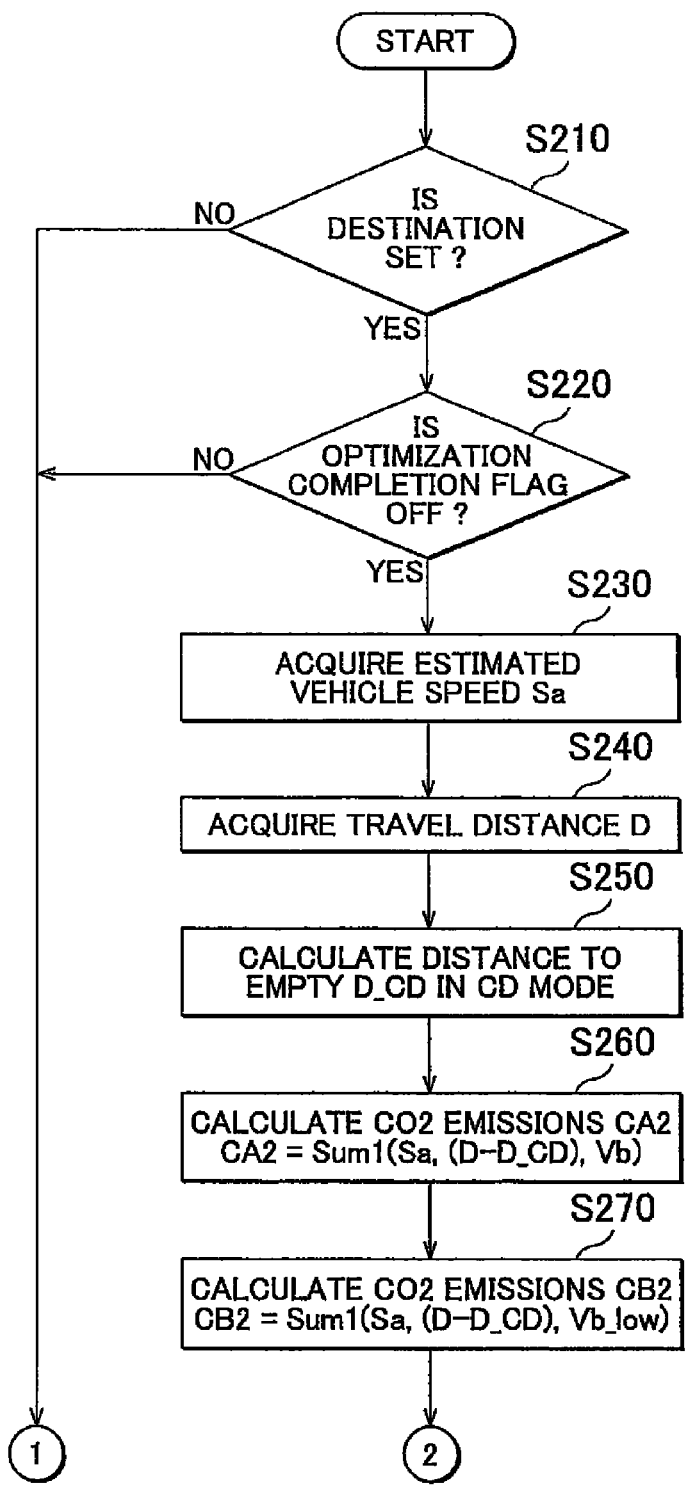
FIGS. 11A and 11B are flowcharts for illustrating the procedure of processes executed by the HV-ECU according to the second embodiment.
Figure 11B:
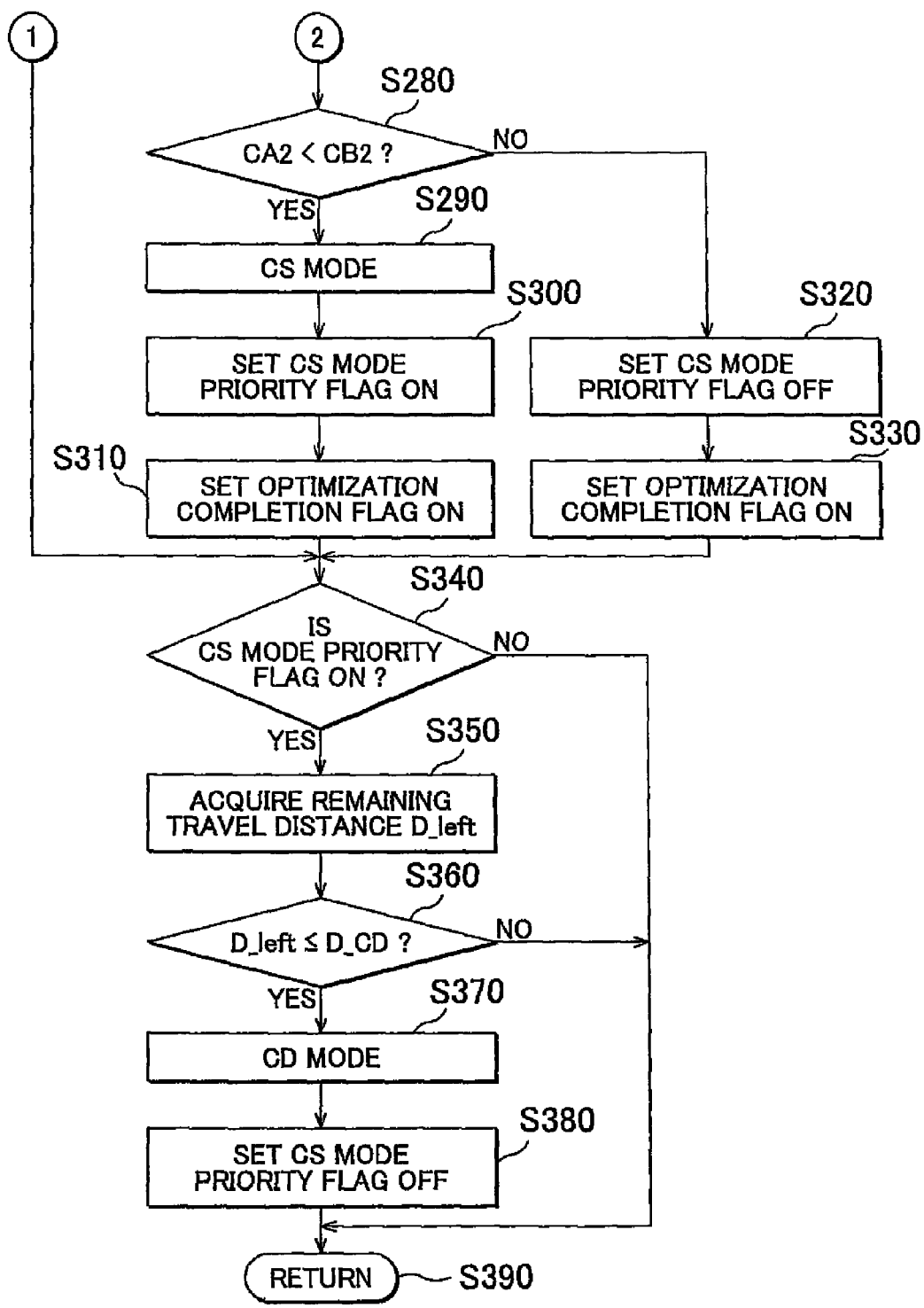

FIGS. 11A and 11B are flowcharts for illustrating the procedure of processes executed by the HV-ECU 36A according to the second embodiment. Note that the processes shown in the flowchart are called from a main routine and executed at constant time intervals or each time a predetermined condition is satisfied.

As shown in FIGS. 11A and 11B, the processes from step S210 to step S240 are respectively equivalent to the processes from step S10 to step S40 shown in FIG. 6, so the overlap description is omitted. When the travel distance D to the destination is acquired from the car navigation system 38 in step 240, the HV-ECU 36A calculates the distance to empty D_CD in the CD mode (step S250). For example, the HV-ECU 36A divides a storage capacity calculated on the basis of the SOC by an electric power consumption (Wh/km) to thereby make it possible to calculate the distance to empty D_CD.

Subsequently, the HV-ECU 36A uses the estimated vehicle speed Sa, the travel distance D, the distance to empty D_CD and the voltage Vb of the electrical storage device 16 to calculate the CO2 emissions CA2 if the vehicle travels by preceding the CS mode over the CD mode using the above described mathematical expression (3) (step S260). Furthermore, the HV-ECU 36A calculates the CO2 emissions CB2 if the vehicle travels in the CS mode after the CD mode using the above described mathematical expression (4) (step S270).

Then, the HV-ECU 36A determines whether the CO2 emissions CA2 are smaller than the CO2 emissions CB2 (step S280). When it is determined that the CO2 emissions CA2 are smaller than the CO2 emissions CB2 (YES in step S280), the HV-ECU 36A sets the drive mode to the CS mode (step S290). Then, the HV-ECU 36A sets a CS mode priority flag on (step S300), and further sets the optimization completion flag on (step S310).

On the other hand, when it is determined in step S280 that the CO2 emissions CA2 are larger than or equal to the CO2 emissions CB2 (NO in step S280), the HV-ECU 36A sets the CS mode priority flag off (step S320), and further sets the optimization completion flag on (step S330). Note that, in this case, the vehicle starts traveling in the default CD mode set after the charging of the electrical storage device 16 by the charger 40 has been completed.

Subsequently, the HV-ECU 36A determines whether the CS mode priority flag is on (step S340). When it is determined that the CS mode priority flag is on (YES in step S340), the HV-ECU 36A acquires the remaining travel distance D_left to the destination from the car navigation system 38 (step S350). Then, the HV-ECU 36A determines whether the remaining travel distance D_left is shorter than or equal to the distance to empty D_CD in the CD mode (step S360).

When it is determined that the remaining travel distance D_left is shorter than or equal to the distance to empty D_CD (YES in step S360), the HV-ECU 36A sets the drive mode to the CD mode (step S370), and further sets the CS mode priority flag off (step S380). Note that, when it is determined in step S340 that the CS mode priority flag is off or when it is determined in step S360 that the remaining travel distance D_left is longer than the distance to empty D_CD (NO in step S360), the HV-ECU 36A proceeds with the process to step S390.

As described above, in the second embodiment, if the vehicle travels a predetermined travel route in the CD mode or in the CS mode, it is determined whether it is possible to reduce the CO2 emissions for the travel route by preceding the CS mode over the CD mode in order to keep the voltage of the electrical storage device 16 at a relatively high level, and then switching of the drive mode is controlled on the basis of the determined result. Thus, according to the second embodiment, it is possible to reduce the CO2 emissions in consideration of a loss in the voltage step-up device 17.

Third Embodiment

In the first embodiment, it is determined whether it is possible to reduce the CO2 emissions by increasing the voltage of the electrical storage device 16; whereas, in a third embodiment, it is determined whether it is possible to reduce the fuel consumption instead of the CO2 emissions, and, when it is determined that it is possible to reduce the fuel consumption, the SOC of the electrical storage device 16 is increased.

The overall configuration of a hybrid vehicle according to the third embodiment is the same as that of the hybrid vehicle 100 according to the first embodiment shown in FIG. 1.

FIG. 12 is a flowchart for illustrating the procedure of processes executed by the HV-ECU 36 according to the third embodiment. As shown in FIG. 12, the flowchart includes steps S65, S85 and S105 respectively instead of steps S60, S80 and S100 in the flowchart shown in FIG. 6.

That is, when the voltage Vb of the electrical storage device 16 is acquired in step S50, the HV-ECU 36 calculates a fuel consumption FA1 if the vehicle travels a travel route without increasing the voltage Vb of the electrical storage device 16 (that is, without increasing the SOC) (step S65). As for a specific method of calculating the fuel consumption FA1, the HV-ECU 36, for example, uses a prepared fuel consumption map (FIG. 5) to calculate an instantaneous fuel consumption on the basis of the voltage Vb of the electrical storage device 16 and the estimated vehicle speed Sa and then to calculate the fuel consumption for the travel route by multiplying the calculated instantaneous fuel consumption by the travel distance D. When a series of these computations are denoted by Sum2, the fuel consumption FA1 is expressed by the following mathematical expression.

$$\text{Fuel consumption } FA1 = \text{Sum2}(Sa, D, Vb) \quad (5)$$

In addition, when the target voltage Vtar is set in step S70, the HV-ECU 36 calculates a fuel consumption FB1 if the vehicle travels the travel route by increasing the voltage Vb of the electrical storage device 16 (that is, by increasing the SOC) (step S85). As for a specific method of calculating the fuel consumption FB1, the HV-ECU 36, for example, calculates a required fuel consumption in order to increase the voltage of the electrical storage device 16 to the target voltage Vtar using a prepared function f2. The function f2 is to estimate an energy amount required to increase the voltage Vb to the target voltage Vtar by, for example, multiplying an increase in the SOC by an efficiency coefficient k of a path from the engine 2 to the electrical storage device 16 and then to calculate a fuel consumption from the estimated energy amount. Then, the HV-ECU 36 adds the calculated fuel consumption to the fuel consumption if the vehicle travels by increasing the voltage of the electrical storage device 16 to the target voltage Vtar to thereby calculate the fuel-consumption. FB1. That is, the fuel consumption FB1 may be calculated by the following mathematical expression.

$$\text{Fuel consumption } FB1 = \text{Sum2}(Sa, D, Vtar) + f2((SOC(Vtar) - SOC(Vb)) \times k) \quad (6)$$

In addition, when it is determined in step S90 that the voltage Vb is lower than the target voltage Vtar, the HV-ECU 36 determines whether the fuel consumption FB1 calculated in step S85 is smaller than the fuel consumption FA1 calculated in step S65 (step S105). Then, when it is determined that the fuel consumption FB1 is smaller than the fuel consumption FA1 (YES in step S105), the process proceeds to step S110, and then the SOC of the electrical storage device 16 is controlled so as to increase the SOC.

Note that the other processes shown in the flowchart are already described with reference to FIG. 6, so the overlap description is omitted.

As described above, in the third embodiment, it is determined whether it is possible to reduce a fuel consumption for a predetermined travel route by increasing the voltage of the electrical storage device 16, and then the SOC of the electrical storage device is controlled on the basis of the determined result. Thus, according to the third embodiment, it is possible to reduce the fuel consumption in consideration of a loss in the voltage step-up device 17.

Fourth Embodiment

In the second embodiment, it is determined whether it is possible to reduce the CO2 emissions by preceding the CS mode over the CD mode; whereas, in a fourth embodiment, it is determined whether it is possible to reduce a fuel consumption instead of CO2 emissions and, when it is determined that it is possible to reduce the fuel consumption, the CS mode is preceded over the CD mode.

The overall configuration of a hybrid vehicle according to the fourth embodiment is the same as that of the hybrid vehicle 100A according to the second embodiment shown in FIG. 7.

Figure 13B:
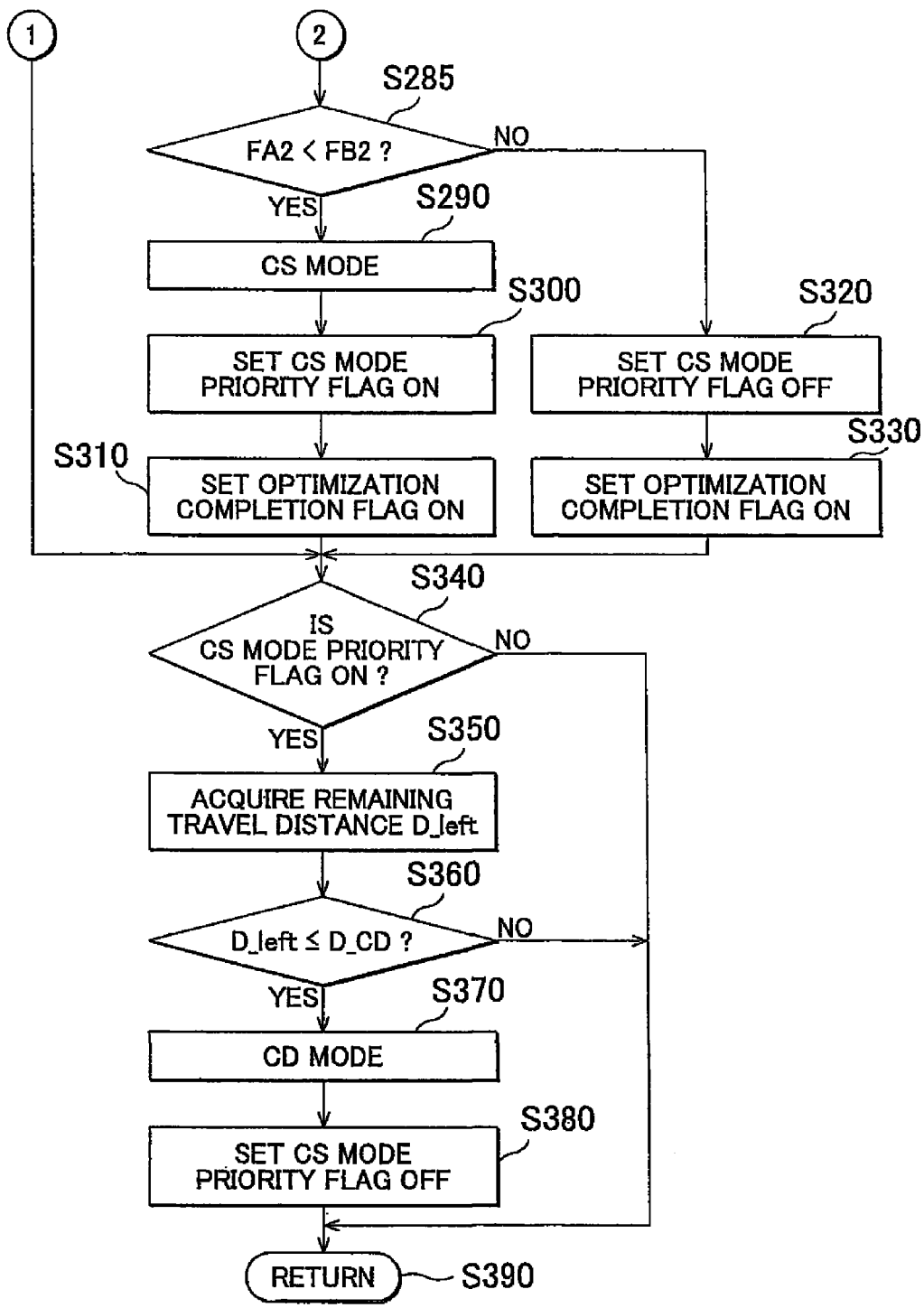

FIGS. 13A and 13B are flowcharts for illustrating the procedure of processes executed by the HV-ECU 36A according to the fourth embodiment. As shown in FIGS. 13A and 13B, the flowchart includes steps S265, S275 and S285 respectively instead of steps S260, S270 and S280 in the flowchart shown in FIGS. 11A and 11B.

That is, when the distance to empty D_CD in the CD mode is calculated in step S250, the HV-ECU 36A calculates a fuel consumption FA2 if the vehicle travels by preceding the CS mode over the CD mode using the following mathematical expression (step S265).

$$\text{Fuel consumption } FA2 = \text{Sum2}(Sa, (D-D\_CD), Vb) \quad (7)$$

Subsequently, the HV-ECU 36A calculates a fuel consumption FB2 if the vehicle travels in the CS mode after the CD mode using the following mathematical expression.

$$\text{Fuel consumption } FB2 = \text{Sum2}(Sa, (D-D\_CD), Vb\_\text{low}) \quad (8)$$

Note that, as described above, Vb_low is the voltage of the electrical storage device 16 after the vehicle travels in the CD mode, that is, the voltage of the electrical storage device 16 when the SOC is the predetermined lower limit value. Then, the HV-ECU 36A determines whether the fuel consumption FA2 is smaller than the fuel consumption FB2 (step S285). When it is determined that the fuel consumption FA2 is smaller than the fuel consumption FB2 (YES in step S285), the process proceeds to step S290, and the drive mode is set to the CS mode. On the other hand, when it is determined that the fuel consumption FA2 is larger than or equal to the fuel consumption FB2 (NO in step S285), the process proceeds to step S320, and the CS mode priority flag is set off.

Note that the other processes shown in the flowchart are already described with reference to FIGS. 11A and 11B, so the overlap description is omitted.

As described above, in the fourth embodiment, when the vehicle travels a predetermined travel route in the CD mode or in the CS mode, it is determined whether it is possible to reduce the fuel consumption for the travel route by preceding the CS mode over the CD mode in order to keep the voltage of the electrical storage device 16 at a relatively high level, and then switching of the drive mode is controlled on the basis of the determined result. Thus, according to the fourth embodiment, it is possible to reduce the fuel consumption in consideration of a loss in the voltage step-up device 17.

Note that, in the above embodiments, a series/parallel hybrid vehicle that is able to transmit the power of the engine 2, which is split by the power split unit 4 to the drive shaft 12 and the motor generator 6, is described; however, the aspect of the invention is applicable to a hybrid vehicle of another type.

Figure 14:
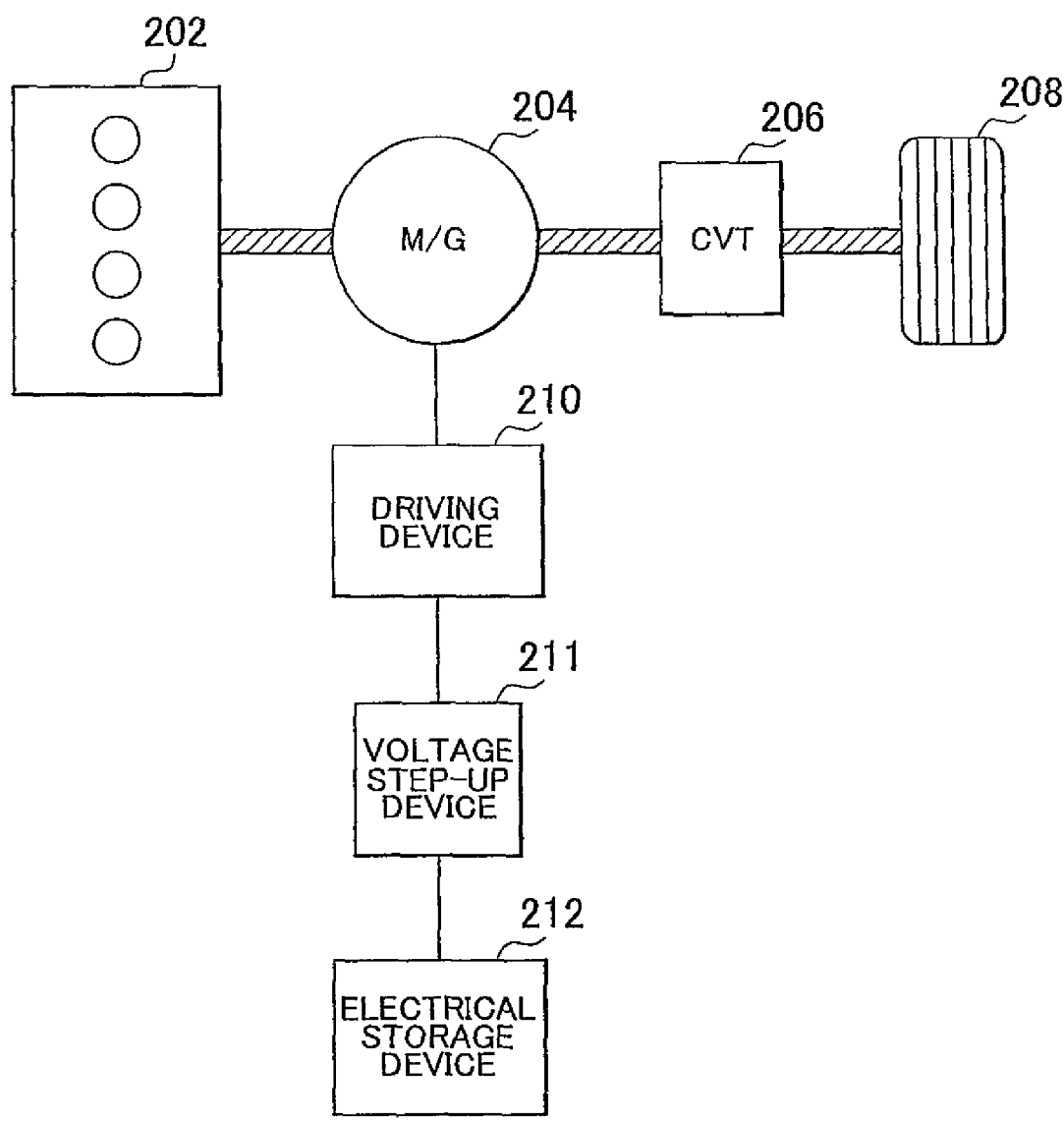
FIG. 14 is an overall block diagram that shows another configuration of a hybrid vehicle to which a control device according to the aspect of the invention is applicable.

FIG. 14 is an overall block diagram that shows another configuration of a hybrid vehicle to which the control device according to the aspect of the invention is applicable. As shown in FIG. 14, a hybrid vehicle 200 includes an engine 202, a motor generator 204, a continuously variable transmission (CVT) 206, a wheel 208, a driving device 210, a voltage step-up device 211 and an electrical storage device 212.

The output power of the engine 202 is transmitted to the wheel 208 via the CVT 206. The motor generator 204 generates torque where necessary to assist driving torque. In addition, the motor generator 204 generates electric power using part of the output power of the engine 202 where necessary to generate electric power for charging the electrical storage device 212.

Then, in the hybrid vehicle 200 as well, it is determined whether it is possible to reduce CO2 emissions or a fuel consumption for a predetermined travel route by increasing the voltage of the electrical storage device 212, and the SOC of the electrical storage device is controlled on the basis of the determined result. By so doing, it is possible to reduce the CO2 emissions or the fuel consumption. In addition, when the vehicle travels the predetermined travel route in the CD mode or in the CS mode, it is possible to reduce the CO2 emissions or the fuel consumption by preceding the CS mode over the CD mode in order to keep the voltage of the electrical storage device 212 at a relatively high level.

Note that, in the above second and fourth embodiments, the hybrid vehicle 100A is a so-called plug-in hybrid vehicle that is able to charge the electrical storage device 16 from a power supply outside the vehicle using the charger 40; however, the aspect of the invention embodied in these embodiments is not limited to the plug-in hybrid vehicle, but it may be applied to a hybrid vehicle, which is not equipped with the charger 40.

In addition, in the first and third embodiments, the hybrid vehicle 100 is not equipped with the charger 40; however, the aspect of the invention embodied in these embodiments may also be applied to a plug-in hybrid vehicle.

In addition, in the above embodiments, the predetermined travel route is set from a travel start point, such as home, to a destination set in the car navigation system 38; instead, when an expressway is used, an expressway travel route may be set as the predetermined travel route.

In addition, in the above embodiments, by way of example, the estimated vehicle speed Sa is a speed limit of the travel route, obtained from the car navigation system 38; instead, an actual vehicle speed when the vehicle travels stably at a high speed after the start of travel may be set as the estimated vehicle speed Sa.

In addition, the aspect of the invention may also be applied to the case where the electrical storage device 16 is formed of a plurality of electrical storage units connected in parallel with one another; however, when applied to the first or third embodiment, some electrical storage units may be intentionally separated. By so doing, it is possible to reduce a charging amount for increasing the voltage of the electrical storage device 16, and, as a result, it is possible to further reduce CO2 emissions or a fuel consumption.

Note that, when the vehicle speed in a travel route is low, the fuel economy improves by decreasing the voltage of the electrical storage device 16 in consideration of a loss in the driving devices 18 and 20, and it may be possible to reduce CO2 emissions or a fuel consumption. Then, when the estimated vehicle speed Sa is low, the SOC of the electrical storage device 16 may be decreased intentionally or the CD mode may be preceded over the CS mode.

Note that, in the above description, the engines 2 and 202 correspond to one embodiments of the "internal combustion engine" according to the aspect of the invention, and the motor generators 10 and 204 correspond to one embodiments of the "driving electric motor" according to the aspect of the invention. In addition, the charger 40 and the inlet 42 form one embodiment of the "charging device" according to the aspect of the invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A control device for a hybrid vehicle that includes an internal combustion engine, a driving electric motor, a driving device that drives the driving electric motor, a rechargeable electrical storage device and a voltage step-up device that is provided between the driving device and the electrical storage device and that steps up an input voltage of the driving device to a voltage of the electrical storage device or above, the control device comprising:
an evaluation unit that determines whether it is possible to reduce a carbon dioxide emissions for a predetermined travel route by increasing the voltage of the electrical storage device; and
a state-of-charge control unit that controls a state of charge of the electrical storage device on the basis of a result determined by the evaluation unit, wherein:
when the evaluation unit determines that it is possible to reduce the carbon dioxide emissions, the state-of-charge control unit controls the state of charge so as to increase a state quantity that indicates the state of charge at a start of the travel route; and
the evaluation unit includes:
a first computing unit that estimates a first emission amount indicating the carbon dioxide emissions if the hybrid vehicle travels the travel route without increasing the state quantity;
a second computing unit that estimates a second emission amount indicating the carbon dioxide emissions if the hybrid vehicle travels the travel route by increasing the state quantity at the start of the travel route; and
a determining unit that determines that it is possible to reduce the carbon dioxide emissions when the second emission amount is smaller than the first emission amount.

2. The control device according to claim 1, wherein the evaluation unit calculates the carbon dioxide emissions on the basis of a vehicle speed, a voltage of the electrical storage device and a travel distance.

3. The control device according to claim 1, wherein the evaluation unit determines whether it is possible to reduce the carbon dioxide emissions in comparison with a case where the hybrid vehicle travels the predetermined travel route while the state of charge of the electrical storage device is controlled to a predetermined target without increasing the voltage of the electrical storage device.

4. A control device for a hybrid vehicle that includes an internal combustion engine, a driving electric motor, a driving device that drives the driving electric motor, a rechargeable electrical storage device and a voltage step-up device that is provided between the driving device and the electrical storage device and that steps up an input voltage of the driving device to a voltage of the electrical storage device or above, the control device comprising:
a drive mode control unit that controls switching of a drive mode that includes a first mode in which the internal combustion engine is stopped and the hybrid vehicle is preferentially caused to drive using only the driving electric motor and a second mode in which the internal combustion engine is operated to keep a state of charge of the electrical storage device at a predetermined target; and
an evaluation unit that, when the hybrid vehicle travels a predetermined travel route in the first or second mode, determines whether it is possible to reduce a carbon dioxide emissions for the travel route by preceding the second mode over the first mode in order to keep the voltage of the electrical storage device at a relatively high level, wherein
the drive mode control unit controls switching of the drive mode on the basis of a result determined by the evaluation unit, wherein the evaluation unit includes:
a first computing unit that estimates a first emission amount indicating the carbon dioxide emissions if the hybrid vehicle travels in the first mode after the hybrid vehicle travels in the second mode when the hybrid vehicle travels the travel route;
a second computing unit that estimates a second emission amount indicating the carbon dioxide emissions if the hybrid vehicle travels in the second mode after the hybrid vehicle travels in the first mode when the hybrid vehicle travels the travel route; and
a determining unit that determines that it is possible to reduce the carbon dioxide emissions when the first emission amount is smaller than the second emission amount.

5. The control device according to claim 4, wherein when the evaluation unit determines that it is possible to reduce the carbon dioxide emissions, the drive mode control unit sets the drive mode to the second mode until a remaining distance of the travel route is shorter than a distance to empty in the first mode.

6. The control device according to claim 4, wherein the evaluation unit calculates the carbon dioxide emissions on the basis of a vehicle speed, a voltage of the electrical storage device and a travel distance.

7. The control device according to claim 4, wherein
the hybrid vehicle further includes a charging device that is configured to charge the electrical storage device with electric power supplied from a power supply outside the vehicle, and
the drive mode control unit sets the drive mode to the first mode after the electrical storage device is charged by the charging device.

8. The control device according to claim 4, wherein the evaluation unit determines whether it is possible to reduce the carbon dioxide emissions in comparison with a case where the hybrid vehicle travels the predetermined travel route while the state of charge of the electrical storage device is controlled to a predetermined target without increasing the voltage of the electrical storage device.

9. A control device for a hybrid vehicle that includes an internal combustion engine, a driving electric motor, a driving device that drives the driving electric motor, a rechargeable electrical storage device and a voltage step-up device that is provided between the driving device and the electrical storage device and that steps up an input voltage of the driving device to a voltage of the electrical storage device or above, the control device comprising:
an evaluation unit that determines whether it is possible to reduce a fuel consumption of the internal combustion engine for a predetermined travel route by increasing the voltage of the electrical storage device; and
a state-of-charge control unit that controls a state of charge of the electrical storage device on the basis of a result determined by the evaluation unit, wherein:
when the evaluation unit determines that it is possible to reduce the fuel consumption, the state-of-charge control unit controls the state of charge so as to increase a state quantity that indicates the state of charge at a start of the travel route; and
the evaluation unit includes:
a first computing unit that estimates a first consumption amount indicating the fuel consumption if the hybrid vehicle travels the travel route without increasing the state quantity;
a second computing unit that estimates a second consumption amount indicating the fuel consumption if the hybrid vehicle travels the travel route by increasing the state quantity at the start of the travel route; and
a determining unit that determines that it is possible to reduce the fuel consumption when the second consumption amount is smaller than the first consumption amount.

10. The control device according to claim 9, wherein the evaluation unit determines whether it is possible to reduce the fuel consumption in comparison with a case where the hybrid vehicle travels the predetermined travel route while the state of charge of the electrical storage device is controlled to a predetermined target without increasing the voltage of the electrical storage device.

11. The control device according to claim 10, wherein when the evaluation unit determines that it is possible to reduce the fuel consumption, the drive mode control unit sets the drive mode to the second mode until a remaining distance of the travel route is shorter than a distance to empty in the first mode.

12. A control device for a hybrid vehicle that includes an internal combustion engine, a driving electric motor, a driving device that drives the driving electric motor, a rechargeable electrical storage device and a voltage step-up device that is provided between the driving device and the electrical storage device and that steps up an input voltage of the driving device to a voltage of the electrical storage device or above, the control device comprising:
a drive mode control unit that controls switching of a drive mode that includes a first mode in which the internal combustion engine is stopped and the hybrid vehicle is preferentially caused to drive using only the driving electric motor and a second mode in which the internal combustion engine is operated to keep a state of charge of the electrical storage device at a predetermined target; and
an evaluation unit that, when the hybrid vehicle travels a predetermined travel route in the first or second mode, determines whether it is possible to reduce a fuel consumption of the internal combustion engine for the travel route by preceding the second mode over the first mode in order to keep the voltage of the electrical storage device at a relatively high level, wherein
the drive mode control unit controls switching of the drive mode on the basis of a result determined by the evaluation unit, wherein
the evaluation unit includes:
a first computing unit that estimates a first consumption amount indicating the fuel consumption if the hybrid vehicle travels in the first mode after the hybrid vehicle travels in the second mode when the hybrid vehicle travels the travel route;
a second computing unit that estimates a second consumption amount indicating the fuel consumption if the hybrid vehicle travels in the second mode after the hybrid vehicle travels in the first mode when the hybrid vehicle travels the travel route; and
a determining unit that determines that it is possible to reduce the fuel consumption when the first consumption amount is smaller than the second consumption amount.

13. The control device according to claim 12, wherein
the hybrid vehicle further includes a charging device that is configured to charge the electrical storage device with electric power supplied from a power supply outside the vehicle, and
the drive mode control unit sets the drive mode to the first mode after the electrical storage device is charged by the charging device.

14. The control device according to claim 12, wherein the evaluation unit determines whether it is possible to reduce the fuel consumption in comparison with a case where the hybrid vehicle travels the predetermined travel route while the state of charge of the electrical storage device is controlled to a predetermined target without increasing the voltage of the electrical storage device.

* * * * *